United States Patent [19]
Volpi

[11] 4,197,761
[45] Apr. 15, 1980

[54] CONTROL LINKAGE

[75] Inventor: Claudio Volpi, Lavinio, Italy

[73] Assignee: Massey-Ferguson Services N.V., Curacao, Netherlands Antilles

[21] Appl. No.: 922,893

[22] Filed: Jul. 10, 1978

[30] Foreign Application Priority Data

Jul. 13, 1977 [IT] Italy ............................ 25702 A/77

[51] Int. Cl.² .................... G05G 11/00; G05G 1/14
[52] U.S. Cl. .................................................. 74/481
[58] Field of Search ............... 74/481, 482, 480 R, 74/479, 100 R, 513, 512, 478, 474

[56] References Cited

U.S. PATENT DOCUMENTS

| | | | |
|---|---|---|---|
| 1,560,037 | 11/1925 | Bushey | 74/481 |
| 2,539,994 | 1/1951 | Engler | 74/481 |
| 2,977,816 | 4/1961 | Rice | 74/481 |
| 3,002,397 | 10/1961 | Du Shane et al. | 74/482 |
| 3,040,596 | 6/1962 | Du Shane et al. | 74/482 |
| 3,439,783 | 4/1969 | Graham | 74/482 |
| 3,537,328 | 11/1970 | Allen | 74/481 |
| 3,645,368 | 2/1972 | Blaauw | 74/481 X |
| 3,783,962 | 1/1974 | Shaffer | 74/479 |

Primary Examiner—Thomas F. Callaghan
Assistant Examiner—Andrew M. Falik
Attorney, Agent, or Firm—William R. Nolte

[57] ABSTRACT

An engine control linkage for connection between an engine output control and hand and foot controls. The linkage includes first and second elements interconnected by a pivotable link, motion being arranged to be transmitted from the hand control to the engine output control by non-pivoting translational movement of the link. A connection is provided between the foot controls and the link for pivoting of the link relative to the first and second elements to vary the effective length of the linkage and thus override the engine output setting of the hand controls.

4 Claims, 5 Drawing Figures

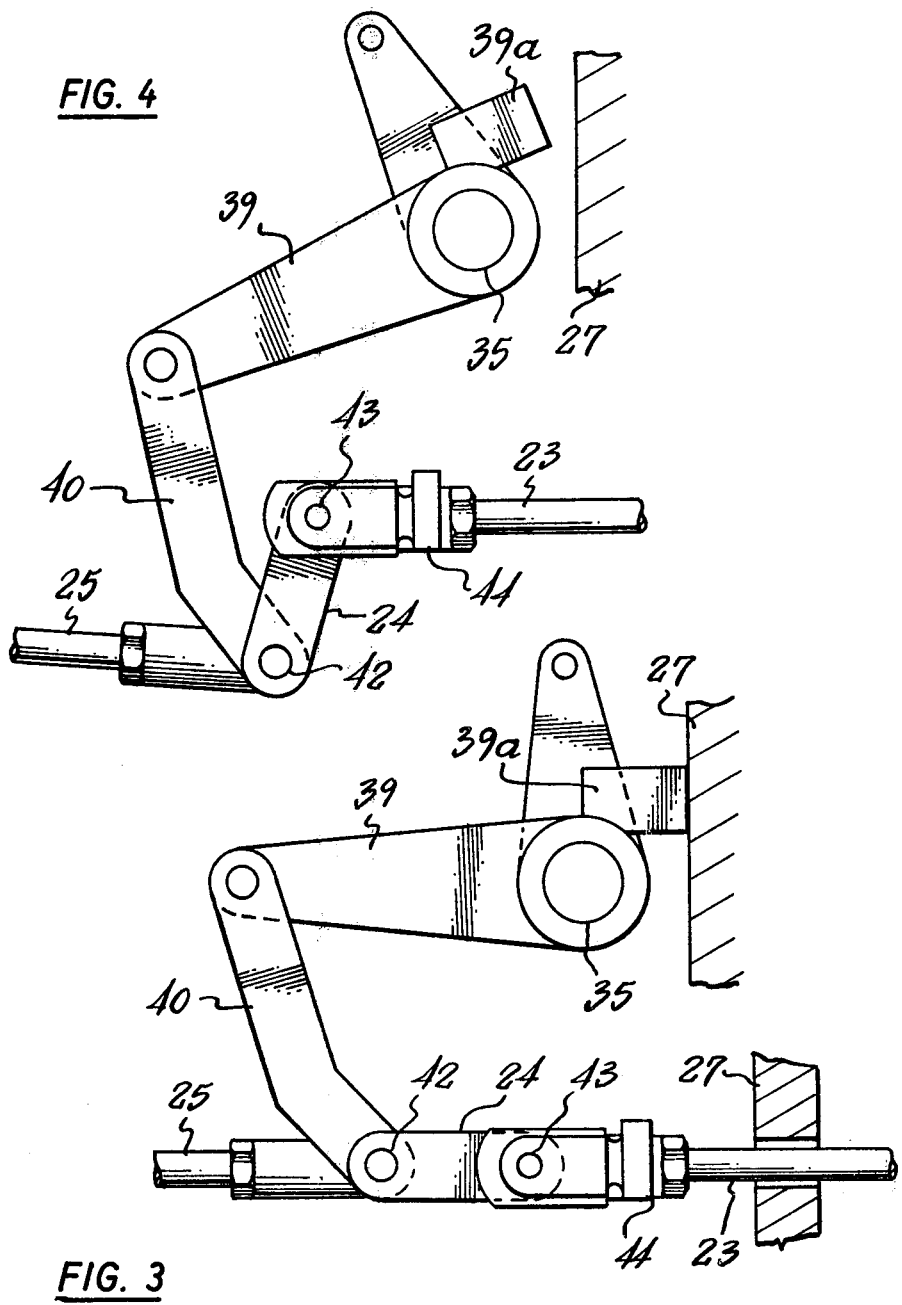

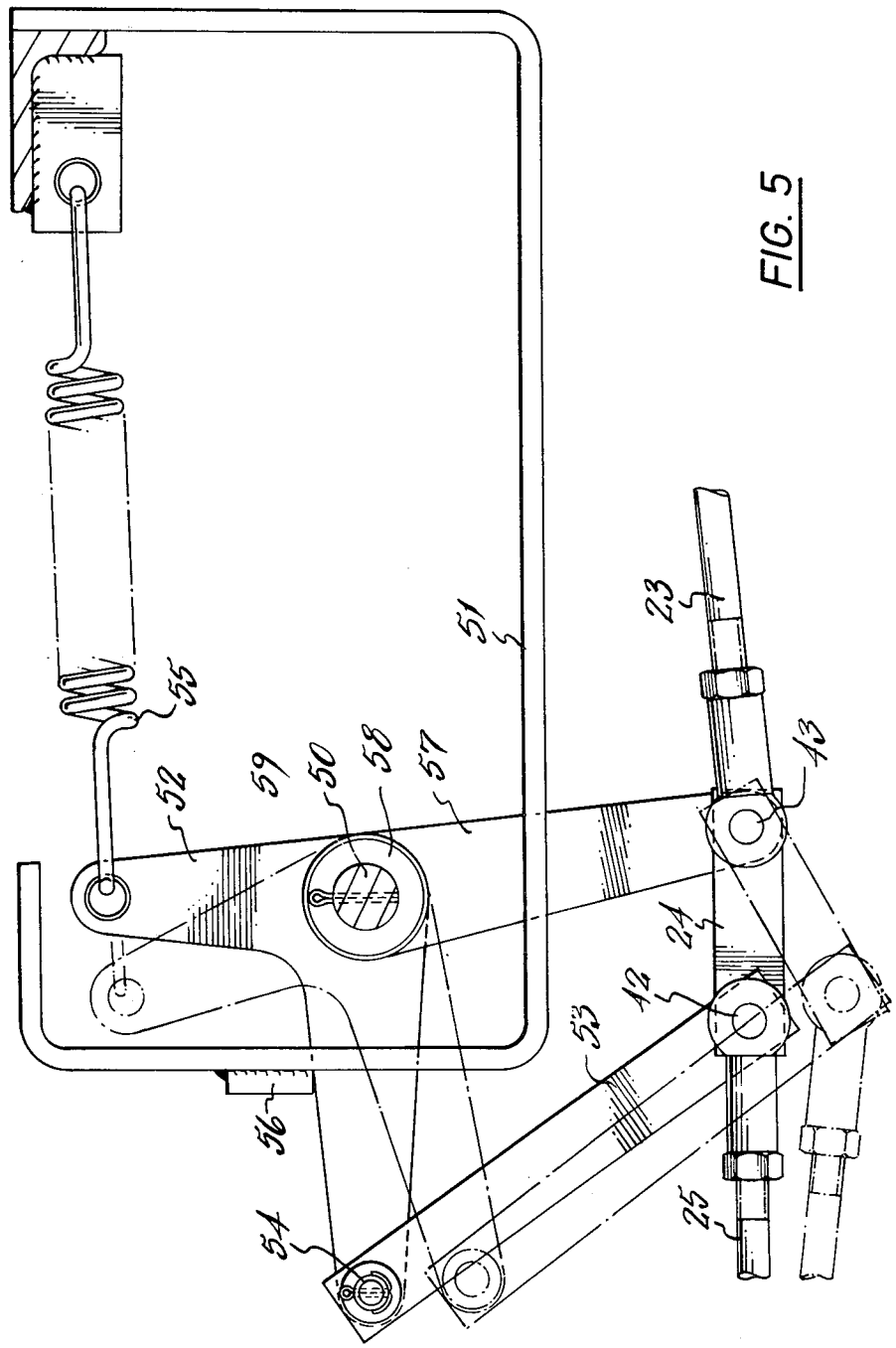

4,197,761

CONTROL LINKAGE

BACKGROUND OF THE INVENTION

This invention relates to engine control linkages and in particular, but not exclusively, to linkages for controlling the throttle setting of track laying or crawler vehicles.

Crawler vehicles often have a manually operated throttle control lever which is normally retained in a pre-set position during use of the vehicle. From time to time it is necessary to reduce this throttle setting for a limited period.

It is an object of the invention to provide a simple yet efficient engine control linkage which is suitable for use in controlling, for example, an engine throttle and which allows a throttle setting to be pre-set and provides means for over-riding this pre-set setting.

SUMMARY OF THE INVENTION

According to the invention there is provided an engine control linkage for connection between engine output control means and first operating means, said linkage including first and second elements interconnected by a pivotable link, motion being arranged to be transmitted from the first operating means to the engine output control means by non-pivoting translational movement of the link, and second operating means connected with the link for pivotting of the link relative to the first and second elements to vary the effective length of the linkage and thus over-ride the engine output setting of the first operating means.

With the above arrangement the first operating means can be used, for example, to set a given engine throttle setting and the second operating means can be used to reduce this setting as referred to above.

The linkage may be arranged so that the first and second elements and the link are in substantial longitudinal alignment when the engine output control means is under the control of the operating means only.

The second operating means can be biassed towards a non-operative position so that on release of the second operating means the control means returns to the setting determined by the first operating means.

Conveniently one of said elements of the linkage may be supported for substantially longitudinal movement only and the link may be supported by its connection with the second operating means so as to return under the action of said bias to a position in which the link and thus the other element are in substantial longitudinal alignment with said one element.

The first and second elements may comprise first and second rods with one end of the link pivotally connected to one end of the first rod and the other end of the link pivotally connected to the adjacent end of the second rod.

The first operating means may be a manually operated lever and the second operating means may be a foot operated control operable to reduce the setting of the first operating means.

BRIEF DESCRIPTION OF THE DRAWINGS

One embodiment of the invention and a modification of part thereof will now be described, by way of example only, with reference to the accompanying drawings, in which:

FIGS. 3 and 4 are side views of part of the linkage in different positions, and

FIG. 5 is a view corresponding to FIG. 3 of a modified form of part of the linkage.

DESCRIPTION OF A PREFERRED EMBODIMENT

Figure 1:
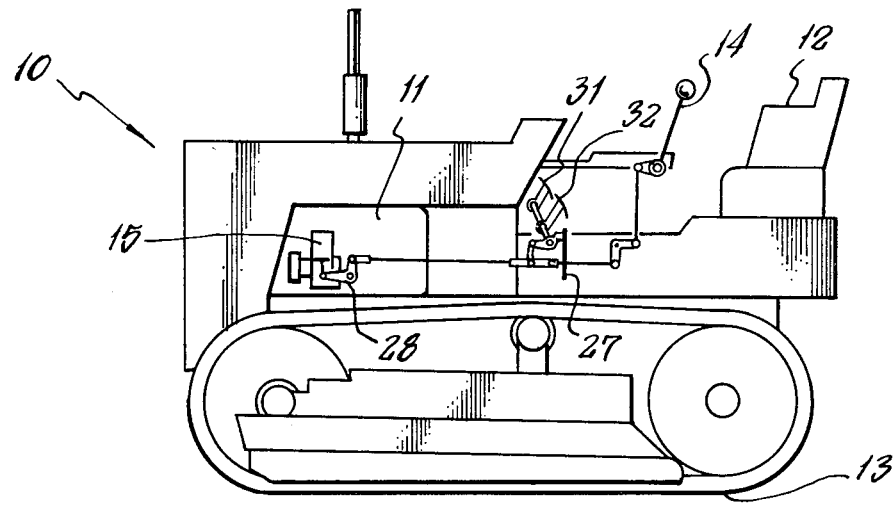
FIG. 1 is a schematic side elevation of a crawler vehicle incorporating the linkage of the invention.

Referring to the drawings and firstly to FIG. 1 a crawler vehicle or tractor 10 has an engine 11 and an operator's seat 12, and the vehicle travels on endless tracks 13 driven from the engine 11. In front of the operator is located a hand-operated lever 14 which acts as a first operating means for controlling the engine output either by controlling the engine speed through a throttle or by controlling the output torque through a torgue convertor or the like (not shown). In operation the lever 14 is moved to the selected setting and so long as the lever remains in this position the output from the engine remains constant. In the illustrated embodiment the lever 14 controls a fuel injector 15 for the engine but it will be appreciated that other engine control functions may equally well be operated.

Figure 2:
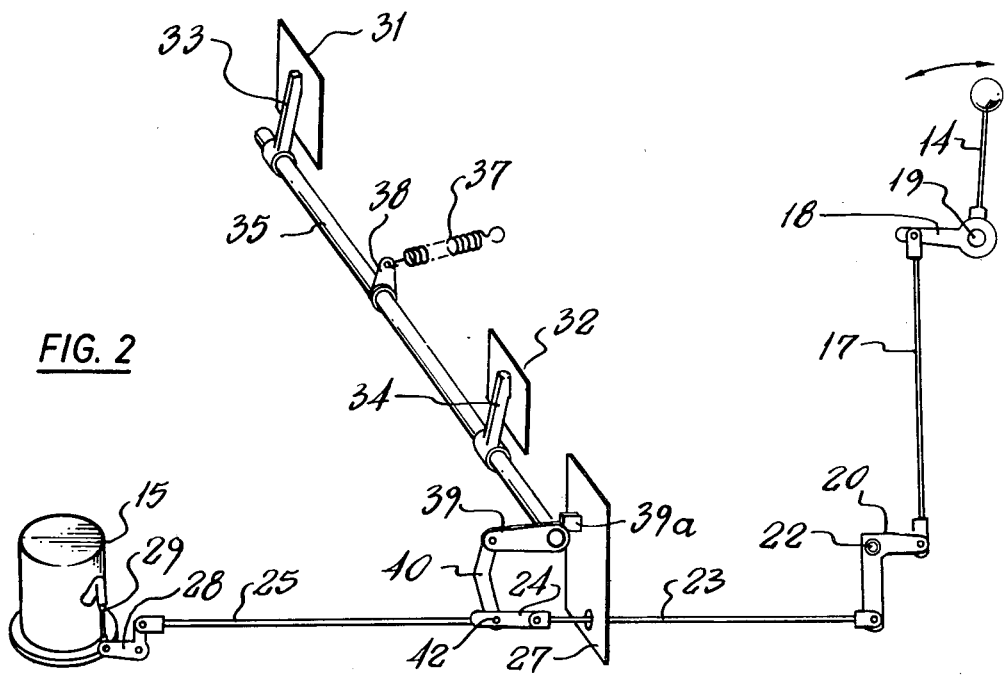
FIG. 2 is a schematic view of the linkage.

Referring now particularly to FIG. 2 the lever 14 is connected to the fuel injector 15 through a linkage consisting of a rod 17 connected at one end to an arm 18 pivoted about an axis 19 by operation of the lever 14. The other end of the rod 17 is connected to a bell-crank 20 pivoted about a pivot 22. The bellcrank 20 is also connected to a linkage element in the form of a further rod 23 and the other end of the rod 23 carries a pivotable link 24 which is in turn connected to a further linkage element in the form of a rod 25. In normal operation when the injector is under the sole control of the lever 14 the rod 23, the link 24 and the rod 25 are in longititudnal alignment, and the rod 23 passes through an opening in a plate 27 which acts as a guide for the rod 23 supporting the rod for longitudinal movement through the opening. The rod 25 is in turn connected to a bell-crank 28 which is coupled to a control element 29 of the fuel injector 15.

Second operating means in the form of transversely spaced foot pedals 31 and 32 are located in the vehicle and the pedals are carried on arms 33 and 34 secured to a cross-shaft 35. A spring 37 secured to a further arm 38 biases the shaft 35 and thus the pedals 31 and 32 towards an inoperative position (shown in FIG. 2) which is the position closest to the operator. When the pedals are in the inoperative position the injector 15 is solely under the control of the lever 14.

At one end of the shaft 35 is an arm 39 which carries a stop 39a for abutment agaisnt the plate 27 when the pedals 31 and 32 are in the inoperative position. The arm 39 is also pivotally attached to a cranked lever 40. The other end of the lever 40 is pivotally attached to the link 24, the connection between the lever 40 and the link 24 being through a pivot pin 42 to provide a common pivot axis with the link 25. The other end of the link 24 is connected to the rod 23 through a pivot 43 mounted on a bracket 44 carried by the rod 23, as best seen in FIGS. 3 and 4.

The connection between the pedals 31, 32 and the link 24 is arranged to be such that when the pedals are returned to their inoperative position by the spring 37 the lever 40 automatically moves the link 24 and thus the rod 25 into longitudinal alignment with the rod 23 as shown in FIG. 2.

Operation of the linkage is as follows.

The crawler vehicle is normally operated with the engine output at a generally constant pre-set value determined by the setting of the lever 14. Movement of the lever 14 causes the arm 18 to move the rod 17, which in turn pivots the lever 20 and moves the rod 23, link 24 and rod 25 in a straight line in a nonpivotting translational movement in the fore and aft direction. This causes the fuel injector setting to be changed in the usual way and during such movement the lever 40 pivots relative to the arm 39 without causing any movement to the pedals 31 and 32.

If it is now desired to reduce the setting of the fuel injector temporarily, operation of the foot pedal 31 or 32 can achieve this without movement of the lever 14. The pedal 31 or 32 is depressed the desired amount to rotate the shaft 35 against the action of the spring 37 so that the arm 39 moves from the position shown in FIGS. 2 and 3 to pivot the link 24 as shown in FIG. 4. It will be seen that the effective length of the linkage between the lever 14 and the injector 15 is reduced by the pivoting of the link 24 since the adjacent ends of the rods 23 and 25 are now closer. This reduction in the effective length of the linkage reduces the setting of the injector 15 so reducing the speed of the engine and decelerating the vehicle.

As soon as the pressure on the foot pedals is released the pedals return to their initial inoperative position and and previous setting of the engine is resumed with the rods 23 and 25 and the link 24 again in longitudinal alignment as shown in FIGS. 2 and 5.

FIG. 5 shows a further form of part of a linkage in accordance with the present invention in which components of similar function to those shown in FIGS. 1 to 4 are similarly numbered.

Again in this construction rods 23 and 25 are pivotally interconnected at 43 and 42 with link 24, the rods 23 and 25 being connected with a hand lever and fuel injector in a similar manner to that described above.

Foot pedals (not shown) similar to the pedals 31 and 32 are mounted on a shaft 50, similar to the shaft 35, which is supported from a box member 51 which extends transversely of the vehicle. The shaft 50 is connected with the link 24 by a bellcrank 52 which rotates with the shaft 50 and is pivotted at 54 to an arm 53 which shares the common pivot 42 with the link 24 and rod 25.

A spring 55 acts between the bellcrank 52 and the member 51 to return the pedals associated with the shaft 50 to their inoperative position in which the bellcrank 52 abuts a stop member 56 which extends transverse to the path of movement of the bellcrank.

As can be seen from FIG. 5 the pivot 43 between the rod 23 and link 24 also connects the rod 23 with a drop arm 57 which has a boss portion 58 which is freely rotatable on the shaft 50. A pin 59 holds the drop arm against the side of the bellcrank thus locating the drop arm against movement along the shaft.

This drop arm thus supports the rod 23 for substantially longitudinal movement and replaces the support provided by the opening in the plate 27 described above. When the pedals are in their inoperative position the rods 23 and 25 and the link 24 are again arranged to be longitudinally aligned as shown in full lines in FIG. 5 so that the injector is solely under the control of the hand lever.

The modified linkage described above operates in the same manner as the linkage described with reference to FIGS. 1 to 4, depression of one or both pedals moving the bellcrank 52, arm 53 and link 24 to, for example the dotted line positions shown in FIG. 5 to reduce the effective length of the linkage and again decelerate the engine.

It will be appreciated that the control linkage of the present invention is simple and efficient in operation and there are no springs or lost motion connections between the hand lever and the injector 15.

I claim:

1. An engine control linkage for connection between engine output control means and first and second operating means, said linkage including a first element connected at one end to said first operating means, a link pivotally connected at one end to said first element, a second element connected at one end to said engine output control means and at its other end pivotally connected to said link, said second operating means including actuating means connected to said link and movable between a non-operative first position for restraining said latter link in in-line alignment with said first and said second elements upon operation of said first operating means, and movable to a second position of movement to pivot said link relative to said first and said second elements to a non-aligned relationship therewith, to thereby override the setting of said engine output means determined by said first operating means.

2. A linkage according to claim 1 wherein said second operating means includes spring means associated therewith to bias the same towards a non-operative position so that on release of the second operating means from said second position of movement the control means returns to the setting determined by the first operating means.

3. A linkage according to claim 1 wherein said first and second elements comprise first and second rods with one end of the link pivotally connected to one end of the first rod and the other end of the link pivotally connected to the adjacent end of the second rod.

4. A linkage according to claim 2 including means connected with said first element to guide the same for substantially longitudinal movement only and wherein said link is supported by said actuating means so as to return under the action of said bias to a position in which said link and said second element are in substantial longitutdinal alignment with said first element.

* * * * *